March 17, 1959  A. W. MOULTROP  2,878,078
ADJUSTABLE FOLDING TRUCK WHEEL STEP
Filed March 1, 1957  2 Sheets-Sheet 1

INVENTOR.
Alvertus W. Moultrop

March 17, 1959  A. W. MOULTROP  2,878,078
ADJUSTABLE FOLDING TRUCK WHEEL STEP
Filed March 1, 1957  2 Sheets-Sheet 2
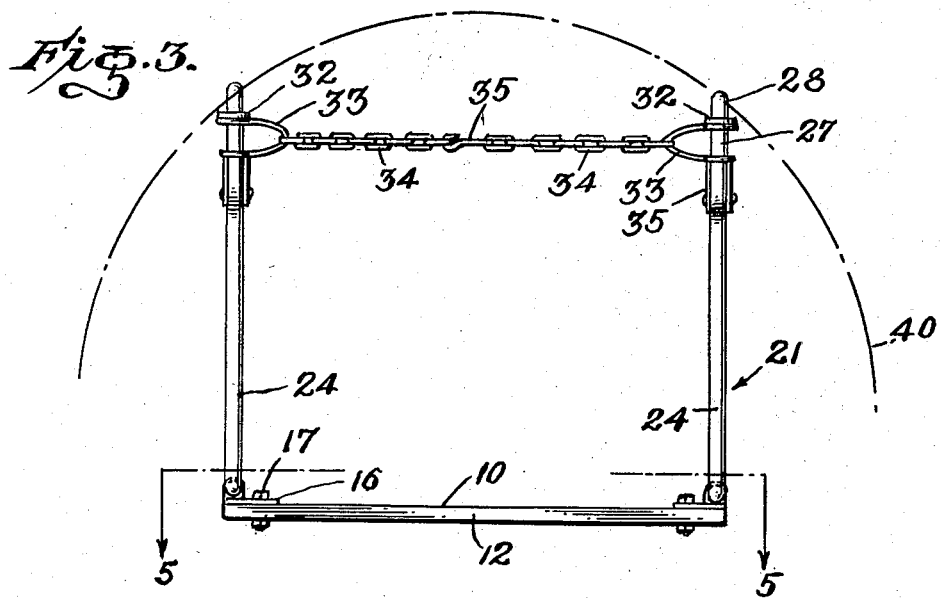
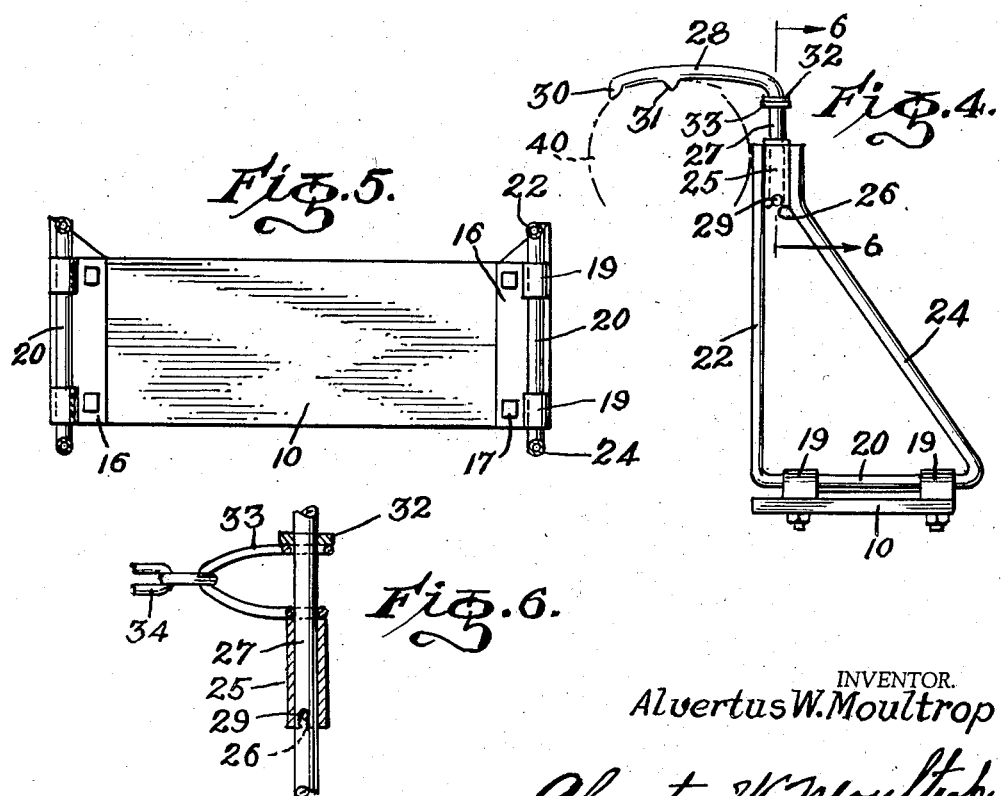
INVENTOR.
Alvertus W. Moultrop United States Patent Office 2,878,078
Patented Mar. 17, 1959

2,878,078

ADJUSTABLE FOLDING TRUCK WHEEL STEP

Alvertus W. Moultrop, Jonesville, Mich.

Application March 1, 1957, Serial No. 643,389

6 Claims. (Cl. 304—15)

This invention relates to folding steps and more particularly to an adjustable folding step for truck wheels.

It is an object of the present invention to provide an adjustable folding step having means for supporting the step from the top of a truck wheel whereby a mechanic may use the step as required while servicing the truck motor.

Another object of the present invention is to provide a folding step that can be raised or lowered, as required, in which a pair of arms extending upwardly from the step platform are adapted to be supported upon the upper tread surfaces of a truck wheel when in use and arranged to be folded into a compact unit when not in use for packing and storage purposes.

It is another object of the present invention to provide an adjustable folding truck wheel step of the above type wherein a pair of triangular arms are rotatably supported upon a single horizontal platform and have means at the upper ends for limiting the outward rotational movement of the arms relative to each other, which means also is adapted to lock the parts in a substantially fixed operative position.

Other objects of the invention are to provide an adjustable folding truck wheel step bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 3 is a front elevational view of the device shown in Figure 2 in an operative position;

Figure 4 is a side elevational view of the device shown in Figure 3;

Figure 5 is a longitudinal cross sectional view taken along line 5—5 of Figure 3; and Figure 6 is an enlarged longitudinal cross sectional view taken along line 6—6 of Figure 4.

Figure 2:
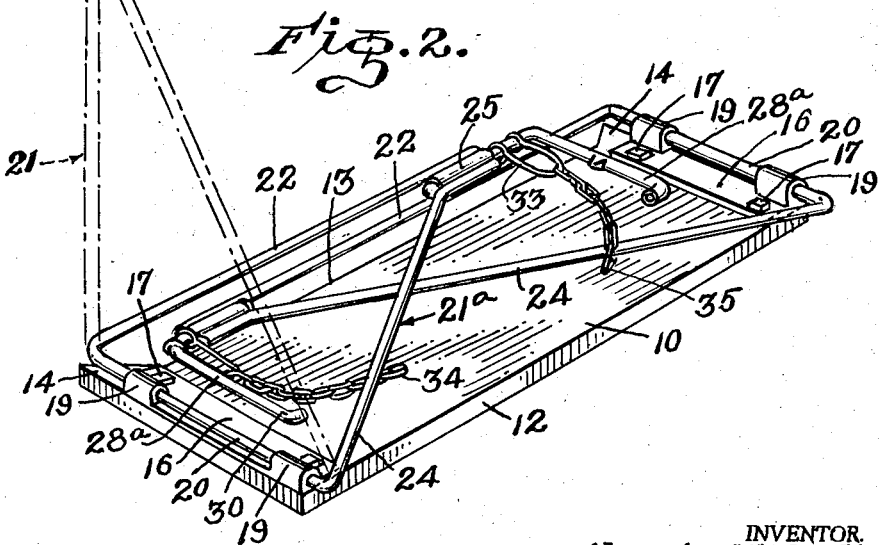
Figure 2 is an enlarged perspective view of the device shown in Figure 1, with the parts in various operative positions.

Referring now more in detail to the drawing, and more particularly to Figure 2 thereof, a device made in accordance with the present invention is shown in an inoperative folded position in full lines, certain parts of which are shown in an operative position in phantom lines. This device includes a substantially flat platform 10 having a straight longitudinal side 12 and an opposite longitudinal side 13 having diversion end portions 14. A bearing support plate 16 is secured, such as by bolts 17, to each end of the platform 10. Each of these plates 16 is provided with a pair of transversely spaced bearings 19 that are adapted to rotatably engage with the base leg 20 of a right triangular arm 21. The other leg 22 of each arm is adjacent to the diverging ends 14, while the hypotenuse leg 24 extends upwardly and rearwardly from the flat side 12. While the parts are adapted to be in a substantially vertical position when in use, the arms 21a are adapted to be folded upon each other, as shown in Figure 2, when the device is not in use.

As is more clearly shown in Figure 4, a bushing 25 is supported between the hypotenuse leg 24 and other leg 22 and has a longitudinal axis lying in the same plane as the triangular arm with which it is associated. Each bushing 25 is arranged to rotatably support the leg 27 of an angle bar member having a transversely extending bar 28. The innermost end of the leg 27 is provided with a transversely extending pin 29 that is adapted to be received within an adjacent slot 26 at the innermost end of the bushing 25. A substantially U-shaped spring type bracket 23 has one leg in abutment with a washer 32 that is fixed to the leg 27, while the opposite side thereof is in engagement with the upper surface of the bushing 25. As is more clearly shown in Figure 6, the spring bracket 33 normally urges the leg 27 in an upward direction, whereupon the pin 29 engages with the slot 26 so as to prevent the rotation of the angle bar within the bracket. Therefore, in a normally disposed position as shown in Figure 4, the transverse bar 28 extends in a direction away from the adjacent platform 10 so as to engage the top surfaces of a tire 40. A downwardly extending projection 30 at the end of the bar 28 and an intermediate lug 31 provide means for maintaining the desired position of the platform upon the wheel. A separate section of chain 34 is secured at one end to each of the spring brackets 33, as shown in Figure 3, and a snap or hook fastener 35 secured to one section is arranged to releasably or detachably engage with the other section in order to limit the outward rotational movement of the triangular arms 21 with respect to each other, thereby maintaining them in a spaced parallel relationship when the platform is supported from the truck tire.

Figure 1:
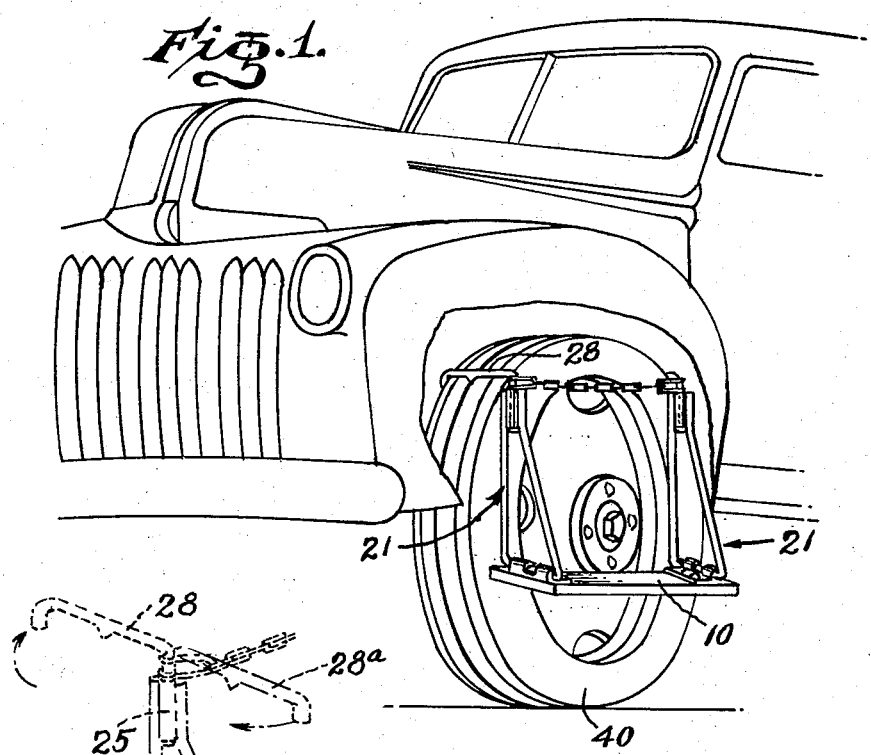
Figure 1 is a perspective view of a truck wheel step made in accordance with the present invention in operative use upon a truck wheel.

In using the device, with the parts in a proper assembled relationship, the bars 28 are engaged upon the upper tread surfaces of the tire 40, in the manner shown in Figure 1. In this position, the diverging ends 14 of the adjacent side 13 of the platform position the platform 10 relative to the tire. The assembled platform may be readily removed from one tire and applied to the opposite tire, if desired, merely by lifting the entire platform from its support upon the tire. In the event that it is desired to collapse the unit, the hook 35 is disengaged from the opposite chain section so that the arms 21 may be rotated downwardly into a folded position 21a, and the bar 28 raised vertically against the action of the associated spring brackets 33, so that it may be rotated in an opposite direction 28a wherein it overlies the platform 10, in the manner shown in Figure 2. It will be recognized that the collapsed unit provides a very compact unit that is readily adapted for storage and shipping purposes. Also, it may be readily assembled as required with a minimum amount of effort.

While various changes may be made in the detail construction, it shall be understood that such changes shall be within the spirit and scope of the present invention as defined by the appended claims.

What I claim as new and desire to protect by Letters Patent of the United States is:

1. A folding step, comprising, in combination, a rectangular platform, a pair of right triangular arms each having a horizontal base rotatably supported at opposite ends of said platform and a perpendicularly related riser integral at one end with one end of said base, an angle bar supported upon the opposite end of each said riser for rotation about an axis parallel to the longitudinal axis of said riser, said angle bar having means for engaging a tire tread, means for releasably maintaining each said angle bar in the plane defined by said associated triangular arm, and means extending between said arms for limiting relative rotation therebetween.

2. The combination according to claim 1, wherein each said arm location includes a bushing having a longitudinal axis lying in the plane of said arm, and said angle bar includes a leg rotatably supported within said bushing for rotation about said longitudinal axis.

3. The combination according to claim 2, wherein said means for engaging a tire tread includes a transverse bar forming a part of said angle bar normally extending substantially parallel to said platform for engaging the upper tread surface of a tire.

4. The combination according to claim 3, wherein the distance between said bars associated with each said triangular arm is less than the diameter of the tire upon which the step is supported.

5. The combination according to claim 4, wherein said means for limiting relative rotation between said triangular arms includes detachable flexible chain means secured to each of said angle bar legs.

6. The combination according to claim 5, wherein said releasable means includes a transverse slot in said bushing, a transverse pin integral with said angle bar leg, and a spring connected to each end of said flexible chain means carried by said associated leg normally urging said pin toward engagement with said slot.

References Cited in the file of this patent
UNITED STATES PATENTS

| | | |
|---|---|---|
| 2,378,678 | Anderson | June 19, 1945 |
| 2,624,590 | Tilton | Jan. 6, 1953 |
| 2,679,436 | Viebrock et al. | May 25, 1954 |
| 2,727,793 | Ricciuti | Dec. 20, 1955 |
| 2,772,720 | Zody et al. | Dec. 4, 1956 |